United States Patent [19]
Yesel et al.

[11] Patent Number: 5,520,593
[45] Date of Patent: May 28, 1996

[54] TRANSMISSION SHIFT CONTROL AND SHIFT PREVENTION DURING AN INCHING OPERATION

[75] Inventors: Leon P. Yesel, East Peoria; John P. Kitzerow, Metamora, both of Ill.

[73] Assignee: Caterpillar Inc., Peoria, Ill.

[21] Appl. No.: 275,856

[22] Filed: Jul. 15, 1994

[51] Int. Cl.$^6$ .......................... B60K 41/04; B60K 41/24; F16H 61/00

[52] U.S. Cl. ................ 477/77; 477/79; 477/115; 477/116; 74/336 R

[58] Field of Search .................. 477/77, 78, 79, 477/80, 115, 116; 74/335, 336 R

[56] References Cited

U.S. PATENT DOCUMENTS

| | | | |
|---|---|---|---|
| 4,164,876 | 8/1979 | Peppel | 74/336 R |
| 4,608,873 | 9/1986 | Redzinski | 74/336 R |
| 4,662,494 | 5/1987 | Wakiya et al. | 477/77 X |
| 4,768,636 | 9/1988 | Ito et al. | 477/78 X |
| 5,050,456 | 9/1991 | Fukuda | 477/115 |

FOREIGN PATENT DOCUMENTS 405141530  6/1993  Japan ..................... 477/116

*Primary Examiner*—Khoi Q. Ta
*Attorney, Agent, or Firm*—John L. James

[57] ABSTRACT

A method and apparatus for transmission shift control and prevention is provided. When the inching pedal is not depressed, the transmission is free to shift to the desired gear. When the inching pedal is depressed, the transmission is free to shift to the desired gear if the shift is a shift from a gear into neutral. With the inching pedal depressed and the shift lever moved from neutral into a gear, the transmission is free to shift if the transmission speed is below first gear high idle. When a directional shift has been requested, the transmission is free to shift to the desired gear if the transmission speed is below first gear high idle.

7 Claims, 6 Drawing Sheets

TRANSMISSION SHIFT CONTROL AND SHIFT PREVENTION DURING AN INCHING OPERATION

TECHNICAL FIELD

The present invention pertains to a machine having an engine and electronically controlled transmission, and, more particularly, to an apparatus an method for transmission shift control and prevention when an inching pedal is used.

BACKGROUND OF THE INVENTION

A motor grader transmission requires that clutches be engaged simultaneously for power transmission to the ground. These clutches are activated by selector spools that are controlled by solenoid valves. Gear selection is determined by inputs from the shift lever and the transmission shaft output speed sensor. Once the desired gear is determined, the appropriate solenoid valves are energized. Sometimes an operator uses an inching pedal when coasting to a stop or when making a directional shift. With the inching pedal depressed, the operator unfortunately feels each valid shift lever position because the solenoids and transmission clutches energize for each valid shift lever position. Accordingly, it will be appreciated that it will be highly desirable to improve shift quality and reduce cycling of the solenoids and clutches when the inching pedal is depressed so that each valid shift lever position is not felt by the operator.

DISCLOSURE OF THE INVENTION

The present invention is directed to overcoming the problem set forth above. According to one aspect of the present invention, a method for controlling shifting of a transmission of a machine while an inching pedal is depressed. The transmission has an output shaft rotatable at an output speed and torque including a lower speed with high torque and has a number of forward and reverse gears for propelling the machine in forward and reverse directions, respectively, and a nonpropelling neutral gear. The transmission operates in a present gear from the forward, reverse and neutral gears and is shiftable between the forward, neutral and reverse gears.

The method comprises operating a shift control member and requesting a gear from the group of forward, reverse and neutral gears; determining whether an inching control member is actuated to initiate an inching operation wherein the transmission output shaft rotates at the lower speed with high torque; shifting the transmission to the requested gear when the inching control member is not actuated; determining whether the shift control member has operated to request a gear change from either of the forward and reverse gears to the neutral gear; and shifting the transmission to the requested gear when the inching control member is actuated and the shift control member has operated to request a gear change from either of the forward and reverse gears to the neutral gear. The method includes determining whether the shift control member has operated to request a gear change from the neutral gear to one of the forward and reverse gears; determining whether the output shaft speed is below high idle speed for first gear; shifting the transmission to the requested gear when the output shaft speed is below high idle speed for first gear and a gear change from the neutral gear to one of the forward and reverse gears has been requested; and maintaining the present gear when the output shaft speed is not below high idle speed for first gear and a gear change from the neutral gear to one of the formed and reverse gears has been requested. The method also includes determining whether the shift control member has operated to request a gear change that is a gear upshift or gear downshift; maintaining the present gear when the shift control member has operated to request a gear change that is a gear upshift or gear downshift; determining whether the shift control member has operated to request a gear change that is a directional shift; and shifting the transmission to the requested gear when the output shaft speed is below high idle speed for first gear and a directional gear change has been requested.

According to another aspect of the present invention, a shift prevention control is provided for an electronically controlled transmission of a machine. The transmission has an output shaft rotatable at an output speed and torque including a lower speed and high torque and has a number of forward and reverse gears for propelling the machine in forward and reverse directions, respectively, and a nonpropelling neutral gear. The transmission operates in a present gear from the forward, reverse and neutral gears and is shiftable between the forward, neutral and reverse gears, the transmission has a group of solenoid valves for effecting the present gear of the transmission with selected valves of the group of valves energized to effect the present gear from the forward, reverse and neutral gears. The shift prevention control includes a shift control member for requesting a gear from the group of forward, reverse and neutral gears; an inching control member initiating an inching operation wherein the transmission output shaft rotates at the low speed with high torque; means for monitoring transmission output shaft speed; means, responsive to operation of the inching control member and the shift control member, for controllably maintaining the selected valves of the group of solenoid valves energized and maintaining the present gear until the shift control member requests a change from one of the forward and reverse gears to the neutral gear; means, responsive to operation of the inching control member and the shift control member, for controllably maintaining the selected valves of the group of solenoid valves energized and maintaining the present gear until the shift control member requests a change from the neutral gear to one of the forward and reverse gears and the output shaft speed is below high idle speed for first gear; and means, responsive to operation of the inching control member and the shift control member, for controllably maintaining the selected valves of the group of solenoid valves energized and maintaining the present gear until the shift control member requests a change of direction without an upshift or downshift and the output shaft speed is below high idle speed for first gear.

These and other aspects, objects, features and advantages of the present invention will be more clearly understood and appreciated from a review of the following detailed description of the preferred embodiments and appended claims, and by reference to the accompanying drawings.

BEST MODE FOR CARRYING OUT THE INVENTION

Figure 1:
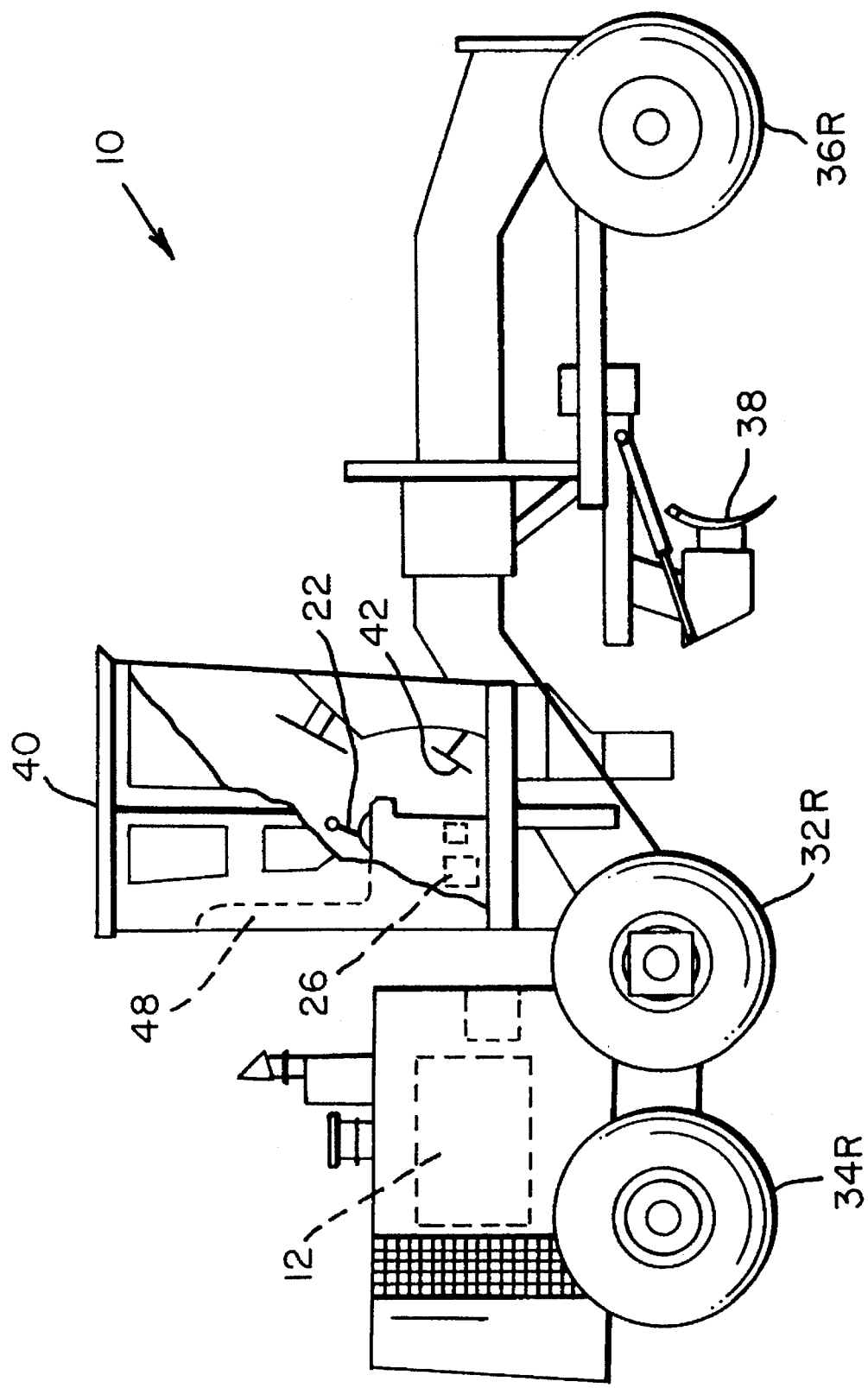
FIG. 1 is a diagrammatic side elevational view of a preferred embodiment of a motor grader constructed for operation in accordance with the present invention.
Figure 2:
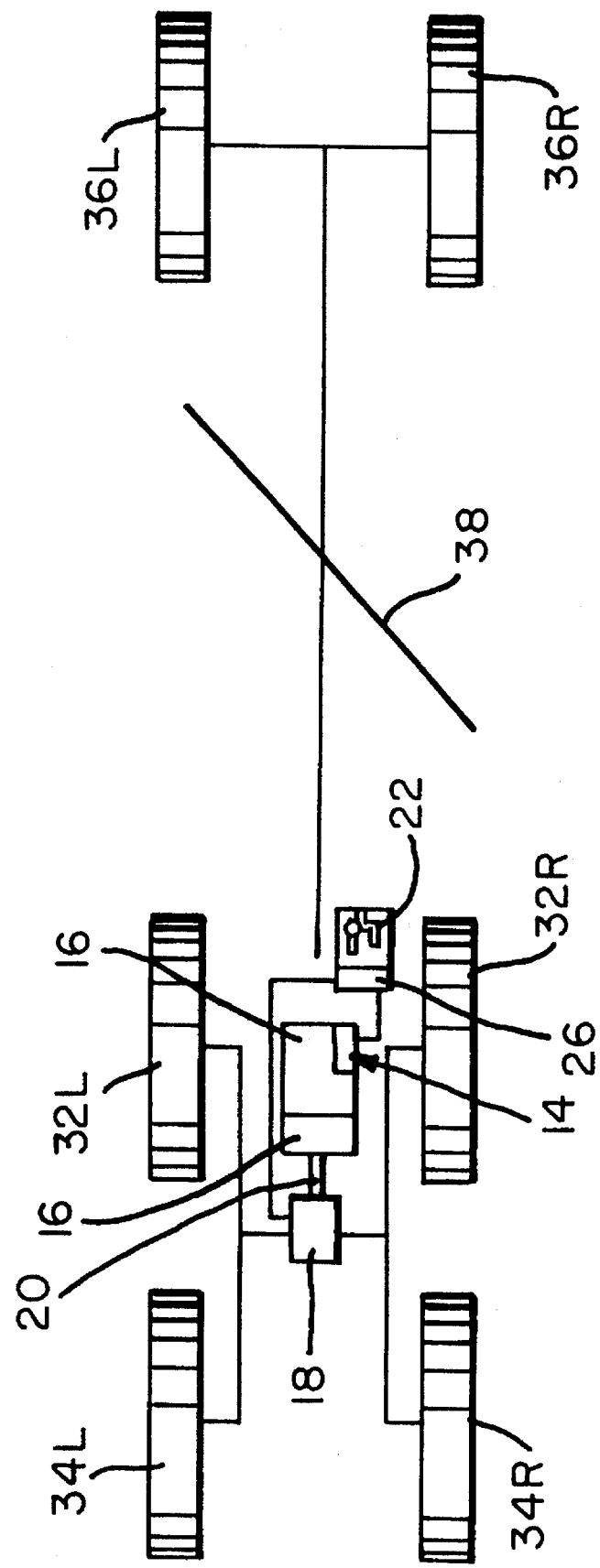
FIG. 2 is a diagrammatic plan view of the motor grader of FIG. 1.
Figure 3:
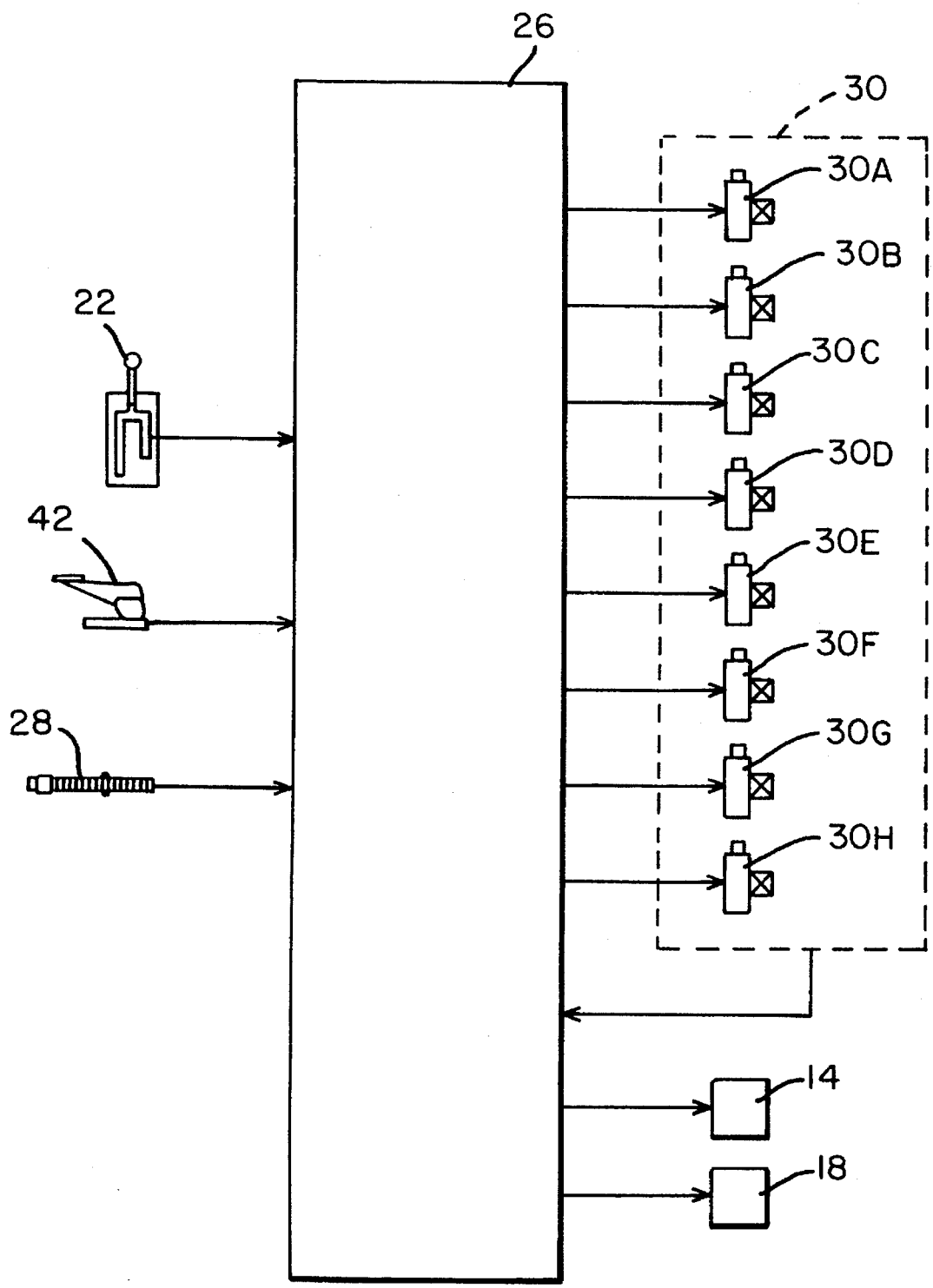
FIG. 3 is a schematic block diagram of the transmission controller of the motor grader of FIG. 1.

Referring to FIGS. 1–3, a machine such as a motor grader 10, has an engine 12 with an engine throttle control 14 for racking the engine and controlling engine speed. A transmission 16 is coupled to the engine 12 and coupled to a differential gearing system 18 by a transmission output shaft 20. The transmission output may be measured in terms of the speed of rotation of its output shaft in rpm. A shift lever 22 is associated with the transmission for shifting the transmission between its various gears which may include a neutral gear as well as 8 forward and 6 reverse gears.

The transmission shift control lever 22 is a multicontact switch that sends position information to a controller 26 to indicate a desired gear for the transmission 16. When the transmission speed, as indicated by a transmission output shaft sensor 28, and the engine speed permit a shift to the desired gear, the controller 26 operates appropriate ones of the transmission solenoids 30. Eight transmission solenoids are illustrated and labeled 30A through 30H. As is known in the art, the transmission solenoids 30 operate the transmission clutches and thereby determine the actual gear of the transmission.

The differential gear drives the rear wheels 32L, 32R, 34L, 34R, with the left wheels 32L, 34L connected in tandem and the right wheels 32R, 34R also connected in tandem. A pair of steering wheels 36L, 36R are located at the front of the motor grader. The blade 38 of the motor grader is located between the front and rear wheels.

Various operator controls are located in an operator's compartment 40. These controls include the transmission shift lever 22 and inching pedal 42. The controller 26 may be conveniently located under the operator's seat 48. The controller 26 is a microprocessor based electronic module that receives information from the shift lever 22, the inching pedal 42 and the transmission output speed sensor 28. The controller 26 actuates appropriate ones of the solenoids 30A–30H for shifting the transmission 16 to the desired gear.

Figure 4:
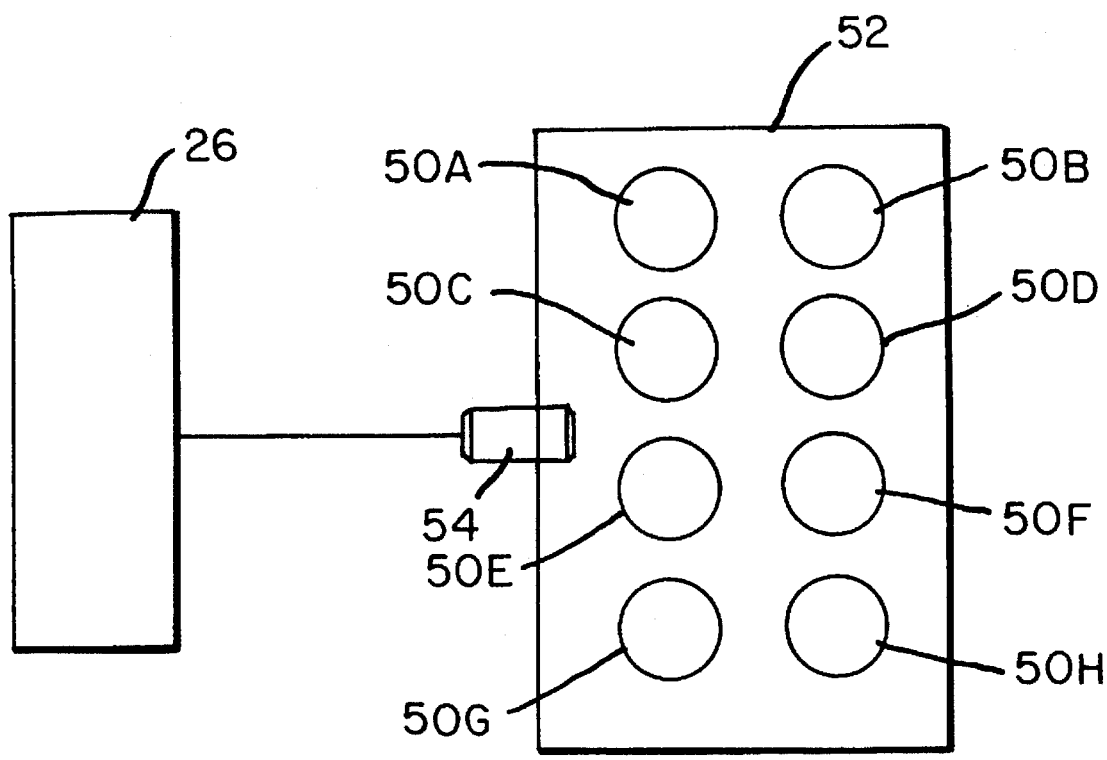
FIG. 4 is a diagram showing the inching pedal switch and its relation to the transmission controller and transmission clutches.

The motor grader countershaft transmission 16 requires three clutches of a group of eight clutches 50A–50H to be engaged simultaneously for power transmission to the ground. The clutches 50 are activated by selector spools that are controlled by the solenoid valves 30A–30H on the hydraulic control module 52 (FIG. 4). Gear selection is determined by input from the shift lever 22 and the transmission output speed sensor 28. When the controller 26 determines the desired gear, it energizes the appropriate solenoid valves 30A–30H. To improve shift quality and reduce cycling of the solenoids 30 and clutches 50 when the inching pedal 42 is depressed, an inching pedal switch 54 is used. The inching pedal switch 54 is ported to a common passage for the transmission direction clutches 50. When the operator depresses the inching pedal 42, the pressure in this common passage is reduced allowing the inching pedal switch 54 to open. At this time, the controller 26 holds the solenoid valves 50A–50H engaged and therefore the clutches 50A–50H engaged, regardless of the shift lever 22 position. With the inching pedal switch 54 open, the operator is free to make shift lever changes without the annoyance of feeling each valid shift lever position. When the operator releases the inching pedal, the pressure in the direction clutch passage is increased allowing the inching pedal switch to close. Before the direction clutch pressure increases to a point allowing clutch modulation, the controller makes appropriate gear changes based on the shift lever handle position and the transmission output speed.

Figure 5A:
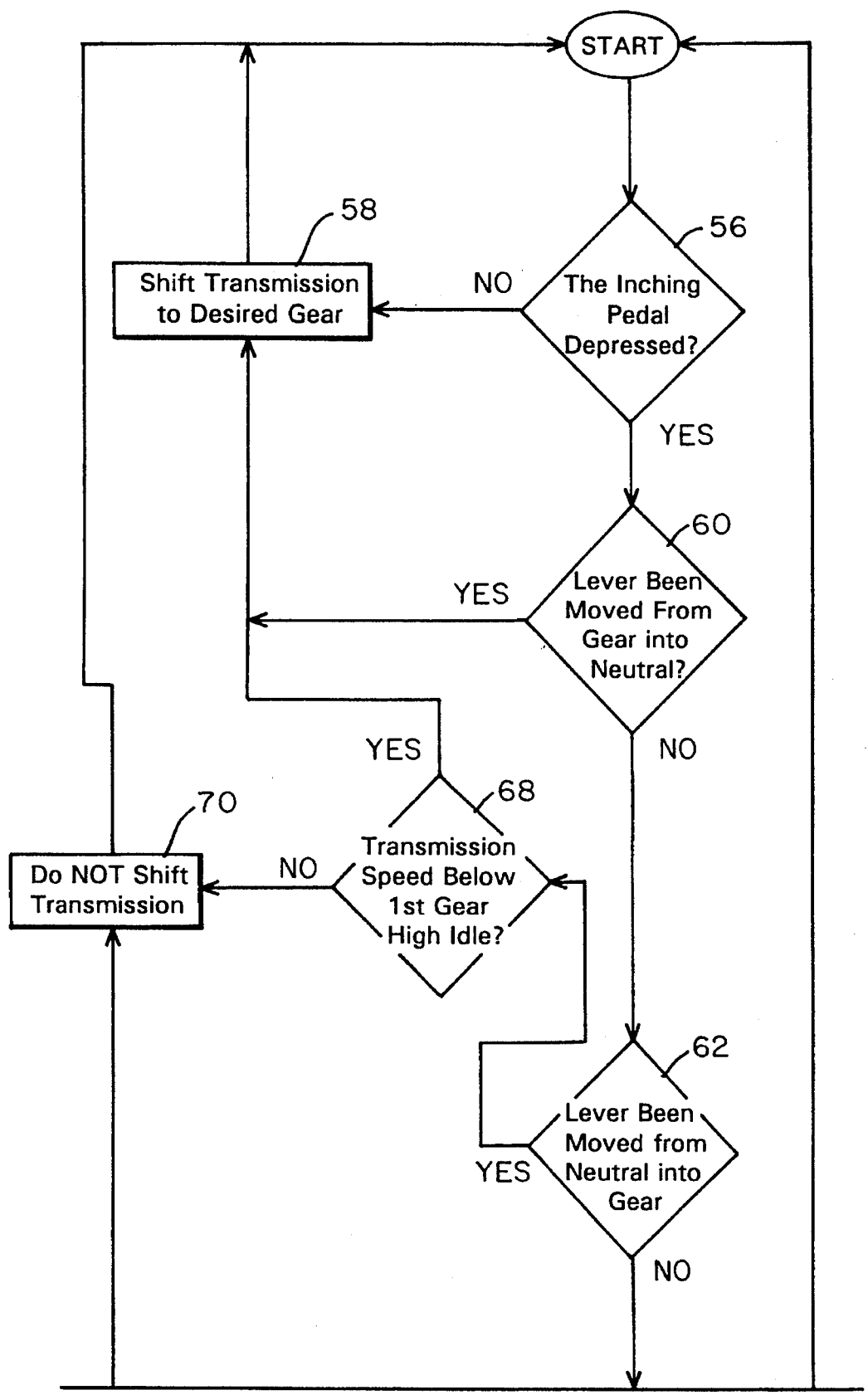
FIGS. 5A and 5B are a flow chart depicting a method of transmission shift prevention and control for an electronically controlled transmission of motor grader incorporating an inching pedal.
Figure 5B:
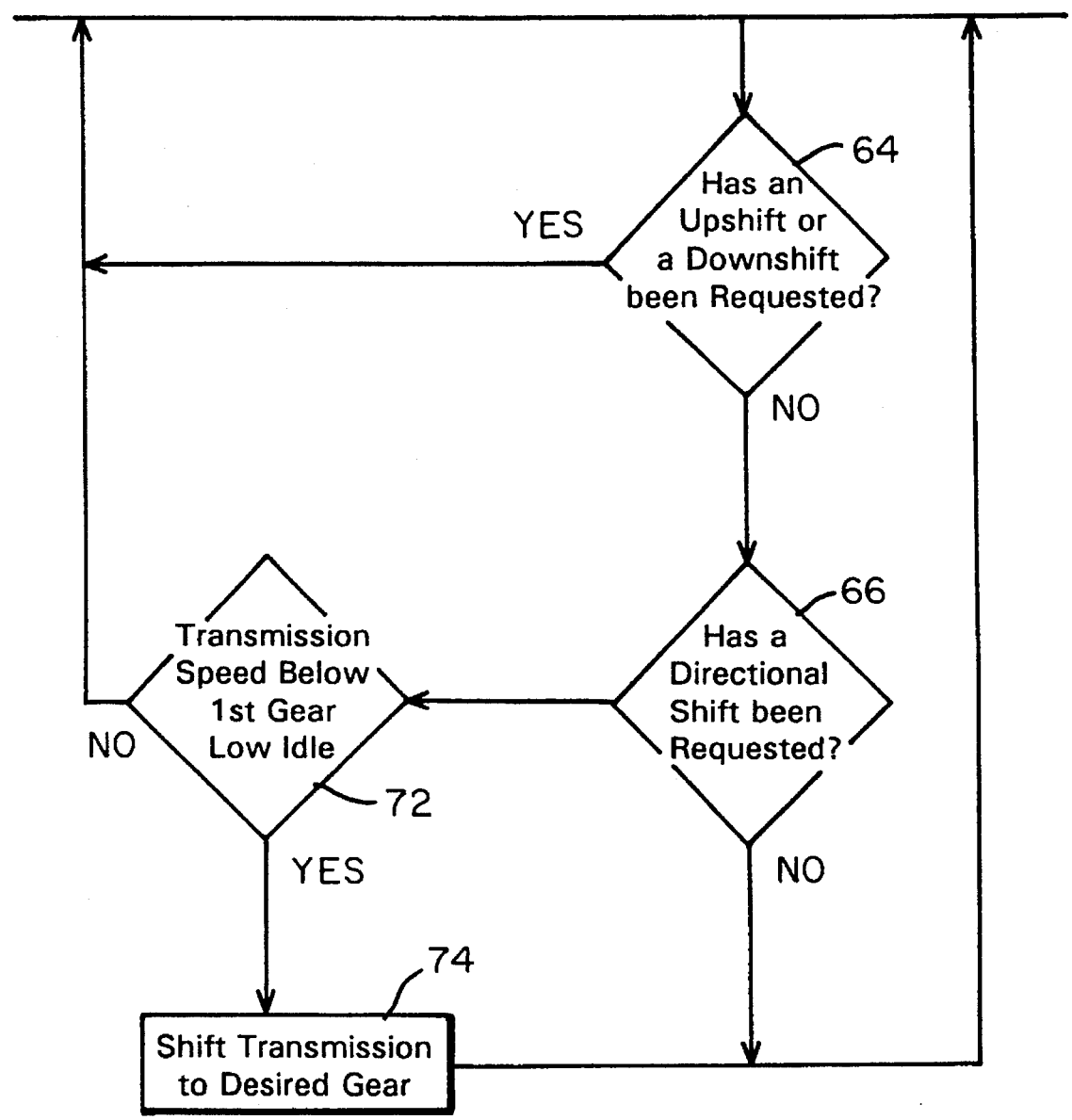

FIGS. 5A and 5B are a flow chart depicting a method of transmission shift control and prevention during an inching operation. An inching operation is a machine operation wherein the operator uses the inching pedal, such as coasting to a stop or making a directional shift. At the start of the method, at decision block 56, the controller queries whether the inching pedal is depressed. When the inching pedal is not depressed, the transmission is shifted to the desired gear and the inquiry at decision block 56 is repeated. When the inching pedal is depressed, the controller makes queries at decision blocks 60, 62, 64 and 66. At block 60, it is determined whether the shift lever has been moved from a gear into neutral. If not, then at decision block 62, it is determined whether the lever has been moved from neutral into a gear, and if not, then at decision block 64, it is determined whether an upshift or a downshift has been requested. If an upshift or a downshift has not been requested, then at block 66, a query is made whether a directional shift has been requested. If a directional shift has not been requested, then the process starts again at decision block 56.

If, at block 60, the shift lever has been moved from gear into neutral, then the transmission is shifted into the desired gear at block 50 and the process starts again.

If, at decision block 62, the lever has been moved from neutral into a gear, then a query is made at decision block 68 to determine whether the transmission speed is below first gear high idle speed. Engine high idle speed is set by a governor of the throttle control 14 and can vary on an rpm basis with high idle being on the order of 2200 rpm and low idle on the order of 800 rpm. Transmission first gear high idle speed is the transmission shaft output speed with the engine at high idle and the transmission engaged in first gear; similarly, transmission first gear low idle speed is the transmission shaft output speed with the engine at low idle and the transmission engaged in first gear. On the motor grader 10, for example, the governor would have two settings, one for low idle and the other for high idle. If the transmission speed is below first gear high idle speed at block 68, then the transmission is shifted to the desired gear at block 58 and the process restarts. If the transmission speed is not below first gear high idle speed, then at block 70 the transmission is not shifted and the process is restarted.

If, at block 64, an upshift or downshift has been requested, then the process moves to block 70 where the transmission is not shifted.

When a directional shift has been requested at decision block 66 and, at block 72, the transmission speed is below first gear low idle speed, then at block 74 the transmission is shifted to the desired gear and the process repeats. If the transmission speed is not below first gear low idle speed, then the transmission is not shifted and the process restarts.

Industrial Applicability

During operation, when the inching pedal is not depressed, the transmission is free to shift to the desired gear. When the inching pedal is depressed, the transmission is free to shift to the desired gear if the shift is a shift from a gear into neutral. With the inching pedal depressed and the shift lever moved from neutral into a gear, the transmission is free to shift if the transmission speed is below first gear high idle. When a directional shift has been requested, the transmission is free to shift to the desired gear if the transmission speed is below first gear high idle. With the inching pedal depressed, the operator does not feel each valid shift lever position because the solenoids and transmission clutches do not energize for each valid shift lever position. Shift quality is thereby improved and cycling of the solenoids and clutches is reduced.

As is evident from the foregoing description, certain aspects of the invention are not limited to the particular details of the examples illustrated, and it is therefore contemplated that other modifications and applications will occur to those skilled in the art. It is accordingly intended that the claims shall cover all such modifications and applications as do not depart from the true spirit and scope of the invention.

What is claimed is:

1. A method for preventing shifting of a transmission during an inching operation, said transmission having an output shaft rotatable at an output speed and torque including a lower speed with high torque and having a number of forward and reverse gears for propelling said machine in forward and reverse directions, respectively, and a nonpropelling neutral gear, said transmission operating in a present gear from among said forward, reverse and neutral gears and being shiftable between said forward, neutral and reverse gears, said method comprising the steps of:
   a. operating a shift control member and requesting a gear from said group of forward, reverse and neutral gears;
   b. determining whether an inching control member is actuated to initiate an inching operation wherein said transmission output shaft rotates at said lower speed with high torque;
   c. shifting said transmission to said requested gear when said inching control member is not actuated;
   d. determining whether said shift control member has operated to request a gear change from either of said forward and reverse gears to said neutral gear; and shifting to said requested gear when said shift control member is operated to request a gear change into said neutral gear;
   e. determining whether said shift control member has operated to request a gear change from said neutral gear to one of said forward and reverse gears.

2. A method, as set forth in claim 1, including:
   determining whether said output shaft speed is below first gear high idle speed when said shift control lever has operated to request a gear change from said neutral gear to one of said forward and reverse gears;
   maintaining said present gear when said output shaft speed is not below first gear high idle speed and a gear change from said neutral gear to one of said forward and reverse gears has been requested; and
   returning to step 1b.

3. A method, as set forth in claim 1, including:
   determining whether said shift control member has operated to request a gear change that is a gear upshift or gear downshift when said shift control lever has not operated to request a gear change from said neutral gear to one of said forward and reverse gears;
   maintaining said present gear when said shift control member has operated to request a gear change that is a gear upshift or gear downshift; and
   returning to step 1b.

4. A method, as set forth in claim 3, including:
   determining whether said shift control member has operated to request a gear change that is also a directional shift; and
   returning to step 1b when a directional shift has not been requested.

5. A method, as set forth in claim 3, including:
   determining whether said shift control member has operated to request a gear change that is a directional shift;
   maintaining said present gear when said output shaft speed is not below first gear high idle speed and a directional gear change has been requested; and
   returning to step 1b.

6. A method for controlling shifting of a transmission of a machine while an inching pedal is depressed, said transmission having an output shaft rotatable at an output speed and torque including a lower speed with high torque and having a number of forward and reverse gears for propelling said machine in forward and reverse directions, respectively, and a nonpropelling neutral gear, said transmission operating in a present gear from among said forward, reverse and neutral gears and being shiftable between said forward, neutral and reverse gears, said method comprising the steps of:
   a. operating a shift control member and requesting a gear from said group of forward, reverse and neutral gears;
   b. determining whether an inching control member is actuated to initiate an inching operation wherein said transmission output shaft rotates at said lower speed with high torque;
   c. shifting said transmission to said requested gear when said inching control member is not actuated;
   d. determining whether said shift control member has operated to request a gear change from either of said forward and reverse gears to said neutral gear;
   e. shifting said transmission to said requested gear when said inching control member is actuated and said shift control member has operated to request a gear change from either of said forward and reverse gears to said neutral gear;
   f. determining whether said shift control member has operated to request a gear change from said neutral gear to one of said forward and reverse gears when said shift control member has not operated to request a gear change from either of said forward and reverse gears to said neutral gear;
   g. determining whether said output shaft speed is below first gear high idle speed;
   h. shifting said transmission to said requested gear when said output shaft speed is below first gear high idle speed and a gear change from said neutral gear to one of said forward and reverse gears has been requested;
   i. maintaining said present gear when said output shaft speed is not below first gear high idle speed and a gear change from said neutral gear to one of said forward and reverse gears has been requested, and returning to step b;
   j. determining whether said shift control member has operated to request a gear change that is a gear upshift or gear downshift when said shift control member has not operated to request a gear change from said neutral gear to one of said forward and reverse gears;
   k. maintaining said present gear when said shift control member has operated to request a gear change that is a gear upshift or gear downshift, and returning to step b;

l. determining whether said shift control member has operated to request a gear change that is a directional shift when an upshift or a downshift has not been requested;

m. returning to step b when a directional shift has not been requested;

n. shifting said transmission to said requested gear when said output shaft speed is below first gear high idle speed and a directional gear change has been requested; and o. maintaining said present gear when said output shaft speed is not below first gear high idle speed and a directional gear change has been requested, and returning to step b.

7. A shift prevention control for an electronically controlled transmission of a machine, said transmission having an output shaft rotatable at an output speed and torque including a lower speed and high torque and having a number of forward and reverse gears for propelling said machine in forward and reverse directions, respectively, and a nonpropelling neutral gear, said transmission operating in a present gear from among said forward, reverse and neutral gears and being shiftable between said forward, neutral and reverse gears, said transmission having a group of solenoid valves for effecting the present gear of said transmission with selected valves of said group of valves being energized to effect the present gear from said forward, reverse and neutral gears, said shift prevention control comprising:

a shift control member for requesting a gear from said group of forward, reverse and neutral gears;

an inching control member initiating an inching operation wherein said transmission output shaft rotates at said lower speed with high torque;

means for monitoring transmission output shaft speed;

means, responsive to operation of said inching control member and said shift control member, for controllably maintaining said selected valves of said group of solenoid valves energized and maintaining said present gear until said shift control member requests a change from one of said forward and reverse gears to said neutral gear;

means, responsive to operation of said inching control member and said shift control member, for controllably maintaining said selected valves of said group of solenoid valves energized and maintaining said present gear until said shift control member requests a change from said neutral gear to one of said forward and reverse gears and said output shaft speed is below first gear high idle speed; and means, responsive to operation of said inching control member and said shift control member, for controllably maintaining said selected valves of said group of solenoid valves energized and maintaining said present gear until said shift control member requests a change of direction without an upshift or downshift and said output shaft speed is below first gear low idle speed.

* * * * *